United States Patent
Lu et al.

(10) Patent No.: US 12,485,541 B1
(45) Date of Patent: Dec. 2, 2025

(54) TRIAGING OF ROBOTS IN AN INDUSTRIAL FACILITY

(71) Applicant: Yokogawa Electric Corporation, Tokyo (JP)

(72) Inventors: Brendon Lu, Sugar Land, TX (US); Sandra Fabiano, Sugar Land, TX (US)

(73) Assignee: Yokogawa Electric Corporation, Tokyo (JP)

( * ) Notice: Subject to any disclaimer, the term of this patent is extended or adjusted under 35 U.S.C. 154(b) by 113 days.

(21) Appl. No.: 18/215,723

(22) Filed: Jun. 28, 2023

(51) Int. Cl.
*B25J 9/16* (2006.01)
(52) U.S. Cl.
CPC .............. *B25J 9/1674* (2013.01); *B25J 9/163* (2013.01); *B25J 9/1687* (2013.01); *B25J 9/1697* (2013.01)
(58) Field of Classification Search
CPC ........ B25J 9/1674; B25J 9/163; B25J 9/1687; B25J 9/1697
See application file for complete search history.

(56) References Cited

U.S. PATENT DOCUMENTS

| 2016/0082593 | A1* | 3/2016 | Inagaki ............... B25J 19/06 700/255 |
| 2018/0036774 | A1* | 2/2018 | Lukka .................... G06F 16/434 |
| 2018/0268217 | A1* | 9/2018 | Murase .................. H04N 23/54 |
| 2018/0307045 | A1 | 10/2018 | Nishi |
| 2019/0389064 | A1 | 12/2019 | High et al. |
| 2020/0276703 | A1 | 9/2020 | Chebotar et al. |
| 2021/0016433 | A1 | 1/2021 | Bidram et al. |
| 2021/0032034 | A1* | 2/2021 | Kalouche ............... B25J 9/1612 |
| 2022/0111523 | A1* | 4/2022 | Lee ...................... G05D 1/0274 |

FOREIGN PATENT DOCUMENTS

| EP | 3696733 | 8/2020 |
| JP | 2019209426 | 12/2019 |

OTHER PUBLICATIONS

Sergey Levine, Peter Pastor, Alex Krizhevsky and Deirdre Quille with title "Learning Hand-Eye Coordination for Robotic Grasping with Deep Learning and Large-Scale Data Collection", 28, Aug. 2016, Google. (Year: 2016).*
Sergey Levine, Peter Pastor, Alex Krizhevsky and Deirdre Quille with title âLearning Hand-Eye Coordination for Robotic Grasping with Deep Learning and Large-Scale Data Collectionâ, 28, Aug. 2016, Google. (Year: 2016) (Year: 2016).*

* cited by examiner

*Primary Examiner* — Wade Miles
*Assistant Examiner* — Aaron G Cain
(74) *Attorney, Agent, or Firm* — Gray Ice Higdon

(57) ABSTRACT

Implementations set forth herein relate to triaging of robots at an industrial facility using generated snapshots that can be based on an operating status of various features of each particular robot. The snapshots can be generated from data generated by each robot and/or data observed for a particular robot, such as images captured of a particular robot. Each snapshot can be utilized to estimate a likelihood or probability that each robot can complete the task without first visiting a service station. When a probability for a particular task is satisfied, the robot predicted to complete the task can be assigned to the particular task. Alternatively, or additionally, when certain estimated probabilities do not satisfy a threshold for completing the task, each robot associated with such an estimated probability can be directed to a service station of the industrial facility.

19 Claims, 6 Drawing Sheets

TRIAGING OF ROBOTS IN AN INDUSTRIAL FACILITY

BACKGROUND

Deployment of robots in industrial facilities has increased over time due to improvements in the capabilities of the robots to autonomously perform scheduled tasks. Such increased use of the robots improves quality and efficiency when performing the tasks. However, robots can be prone to malfunctions and/or being damaged, which not only can reduce the rate of successful completion of the tasks but can also pose a threat to the wellbeing of human workers in the industrial facility. Thus, timely servicing of the robots is important for the safe and efficient operation of the industrial facility. In some cases, robots are serviced when a malfunction is detected, which can lead to increased downtime in the industrial facility. In other cases, the robots are serviced periodically, which often leads to servicing of some robots that do not require servicing, and lead to overcrowding of robot servicing stations.

SUMMARY

Implementations herein relate to triaging of robots at an industrial facility that employs robots to perform a variety of different scheduled tasks, and/or at any other location that can benefit from automated maintenance robots. The triaging of the robots can be performed to: predict whether a robot can successfully perform a task prior to initiating the task, select a robot to perform a task when there is a relatively high estimated probability that the robot will complete the task without anticipated maintenance, and/or predict whether a robot will need maintenance before being assigned a task in the industrial facility.

In some implementations, the triaging of robots can be performed at the direction of one or more applications, devices, and/or any other apparatus or module capable of interacting with a robot. When task data is received by a maintenance application that is responsible for the triaging of robots, a state of one or more robots can be determined by: accessing a plurality of data points associated with each robot, and processing the plurality of data points to generate a snapshot (e.g., a vector, an embedding, etc.) for each respective robot for a given time or duration of time. For example, the data points can characterize a battery charge percentage for each robot, sensor conditions for each robot, a degree of mechanical wear of a portion of a robot, conditions of any mechanical joints of each robot, versions/configurations/statuses of software/firmware, and/or any other feature of the robot that can indicate health and/or operability of the robot. In some implementations, a snapshot can be generated by processing at least one or more images of a respective robot, and the images can be captured (e.g., by that robot, another robot, or any other device) from various perspectives at the industrial facility to determine certain information about the robot. In some implementations, the data points can be determined using one or more image processing techniques and/or using one or more trained machine learning models to process the images. For example, the one or more machine learning models may be trained using historical images of robots labeled with various states or other information (e.g., successfully performed TASK A subsequently, failed at performing TASK B subsequently). Alternatively, or additionally, other data points can be generated or otherwise accessed, e.g., using an application programming interface (API) that facilitates retrieval of data points via a network interface of the robot and/or another computing device. For instance, versions, configurations, and/or statuses of software and/or firmware that executes onboard or otherwise controls a robot may be accessed and evaluated.

In some implementations, once a state of the robot is determined, the maintenance application and/or other application responsible for triaging the robots can determine tasks that the robots can perform and/or are scheduled to perform. In some implementations, task data characterizing one or more tasks of a robot can be available via a server or other device that is accessible to the maintenance application and/or the robots. The task data and the snapshots for the determined states of the robots can be processed to determine a probability distribution for the tasks and robots. In some implementations, the probability distribution can be generated using one or more trained machine learning models that have been trained using historical data. The historical data can include, for example, historical snapshots of robots (i.e., reference robots) at the industrial facility and task data (e.g., a label) indicating whether each robot successfully completed an assigned task while exhibiting a respective historical state indicated by the historical snapshots.

In some implementations, the probability distribution can provide an estimate of whether a particular robot can successfully perform a particular task to be scheduled for the robot. For example, a task can include replacing a flow sensor at the industrial facility; therefore the maintenance application can select, for triaging, robots that are capable of replacing a flow sensor at the industrial facility. The maintenance application can capture one or more snapshots of each selected robot to determine a state of the robot, in furtherance of determining a probability distribution for the selected robots relative to the task to be performed. For example, and based on each snapshot, each robot can exhibit a particular probability that the respective robot can complete the proposed task (e.g., replacing a flow sensor). Each probability can be used to rank each robot, and a particular robot that exhibits a most prioritized rank (e.g., a highest probability of completing the task) relative to the other robots can be selected for completing the proposed task. In some implementations, the probabilities can be generated by mapping one or more snapshot embeddings in an embedding space, and determining a distance (e.g., Euclidean, cosine similarity, etc.) from each embedding to one or more task embeddings. This distance can be proportional to, or otherwise indicate, the probability that a particular robot can complete the proposed task corresponding to the task embedding.

In some implementations, a probability can be generated for each snapshot to indicate whether each robot should receive maintenance before performing a particular task and/or otherwise be assigned a task in the industrial facility. For example, a plurality of robots can be operating within the industrial facility and can either be located in a service station for awaiting maintenance, or be located outside of the service station while executing one or more assigned tasks. The maintenance application can process snapshots, or other data for the robots, and the proposed task to determine whether any robot outside of the service station is available for performing the proposed task. When there are no available robots outside of the service station, the maintenance application can determine whether any robots that are assigned to receive maintenance can perform the task in lieu of receiving the assigned maintenance.

For example, a snapshot for a particular robot can indicate that the particular robot is at the service station to receive battery charge, but otherwise is functioning properly. Based on this determination, the maintenance application can determine, by processing the snapshots of the robots at the service station, that this particular robot can undertake that the assigned task without receiving their assigned maintenance until after performing the proposed task (e.g., the particular robot may have enough charge to complete the proposed task). In some implementations, this determination can be based on a mapping of snapshot embeddings for the robots relative to a mapping of the proposed task embedding and/or a mapping of the assigned maintenance embedding. In other implementations, a regression machine learning model may predict a probability that the robot can complete its task without needing maintenance first. In either case, the triaging of the robots can make more efficient usage of robots for performing tasks in any industrial facility, and preserve resources that may be consumed when restricting robots to a service station.

The above description is provided as an overview of some implementations of the present disclosure. Further description of those implementations, and other implementations, are described in more detail below.

In some implementations, a method may be implemented using one or more processors and may include: generating one or more snapshots associated with a robot that performs maintenance at an industrial facility, wherein each snapshot of the one or more snapshots includes a plurality of data points that collectively indicate a state of the robot; accessing one or more scheduled robot tasks that can be performed by the robot; determining, based on the one or more snapshots and the one or more scheduled robot tasks, a probability of the robot completing at least one task of the one or more scheduled robot tasks, wherein the probability is determined using one or more machine learning models; determining whether the probability indicates the robot is predicted to complete the at least one task of the one or more scheduled robots tasks; in response to determining that the probability indicates the robot is predicted to complete the at least one task of the one or more scheduled robot tasks: causing the robot to perform the at least one task of the one or more scheduled robot tasks; and in response to determining that the probability indicates the robot is predicted to not complete the at least one task of the one or more scheduled robot tasks: causing the robot to arrive at a robot servicing station for maintenance.

In various implementations, the one or more snapshots may be generated based on at least one or more images of the robot captured, at the industrial facility, from one or more different perspectives, and applied as input across a given machine learning model of the one or more machine learning models. In various implementations, the given machine learning model may be trained based on historical images captured of one or more reference robots and data indicative of robot tasks attempted by the one or more reference robots.

In various implementations, the plurality of data points may include a particular data point that indicates whether a sensor of the robot is malfunctioning. In various implementations, the plurality of data points may include a particular data point that indicates a degree of mechanical wear of a portion of the robot.

In various implementations, determining the probability for completing the one or more scheduled robot tasks may include: encoding, using one or more neural networks, the one or more snapshots into one or more snapshot embeddings; encoding, using one or more other neural networks, task data into one or more task embeddings, wherein the task data characterizes the one or more scheduled robot tasks; and determining, based on the one or more snapshot embeddings and the one or more task embeddings, the probability for the robot successfully performing the at least one task of the one or more scheduled robot tasks.

In various implementations, the one or more machine learning models may be trained using historical data that characterizes: a historical robot snapshot, and an outcome of the robot performing a historical robot task subsequent to the historical robot snapshot being captured. In various implementations, determining whether the probability indicates the robot is predicted to complete the at least one task of the one or more scheduled robot tasks may include: determining an estimated probability value of the robot successfully performing the at least one task of the one or more scheduled robot tasks; and determining whether the estimated probability value satisfies a threshold value, wherein the robot is directed to perform the at least one task of the one or more scheduled robot tasks in response to determining the estimated probability value satisfies the threshold value.

In another aspect, a method implemented by one or more processors may include: determining a task to be performed by a robot in an industrial facility having a plurality of robots that perform maintenance at the industrial facility; generating snapshots corresponding to the plurality of robots, wherein each snapshot of the snapshots includes a plurality of data points that collectively indicate a state of a respective robot of the plurality of robots; determining, based on the snapshots and the task to be performed by the robot, a probability distribution of each respective robot of the plurality of robots completing the task, wherein the probability distribution is determined using one or more machine learning models; determining, based on the probability distribution, a respective rank for each robot of the plurality of robots in furtherance of identifying a particular available robot with a most prioritized rank for completing for the task; and causing, based on the respective rank for each robot of the plurality of robots, the particular robot with the most prioritized rank to perform the task.

In various implementations, the snapshots may be generated based on at least one or more images of the plurality of robots captured, at the industrial facility, from one or more different perspectives, and applied as input across a given machine learning model of the one or more machine learning models. In various implementations, the plurality of data points may include a particular data point that indicates whether a sensor of the respective robot is malfunctioning.

In various implementations, the plurality of data points may include a particular data point that indicates mechanical wear of a portion of the respective robot. In various implementations, determining the probability distribution may include: encoding, using one or more neural networks, each respective snapshot of the snapshots into a respective snapshot embedding; wherein each probability of the probability distribution is based on a respective snapshot embedding and task data that characterizes the task.

In various implementations, the one or more machine learning models may be trained using historical data for each of the plurality of robots, and wherein the historical data for each robot of the plurality of robots characterizes: a corresponding historical robot snapshot, and an outcome of the corresponding robot performing a historical robot task subsequent to capturing the corresponding historical snapshot.

In various implementations, determining the probability distribution may include: determining an estimated probability value of each robot of the plurality of the robots successfully performing the task; and determining whether the estimated probability value satisfies a threshold value, wherein one or more robots of the plurality of robots are directed to arrive at a robot servicing station for maintenance in response to determining corresponding estimated probability values do not satisfy the threshold value.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
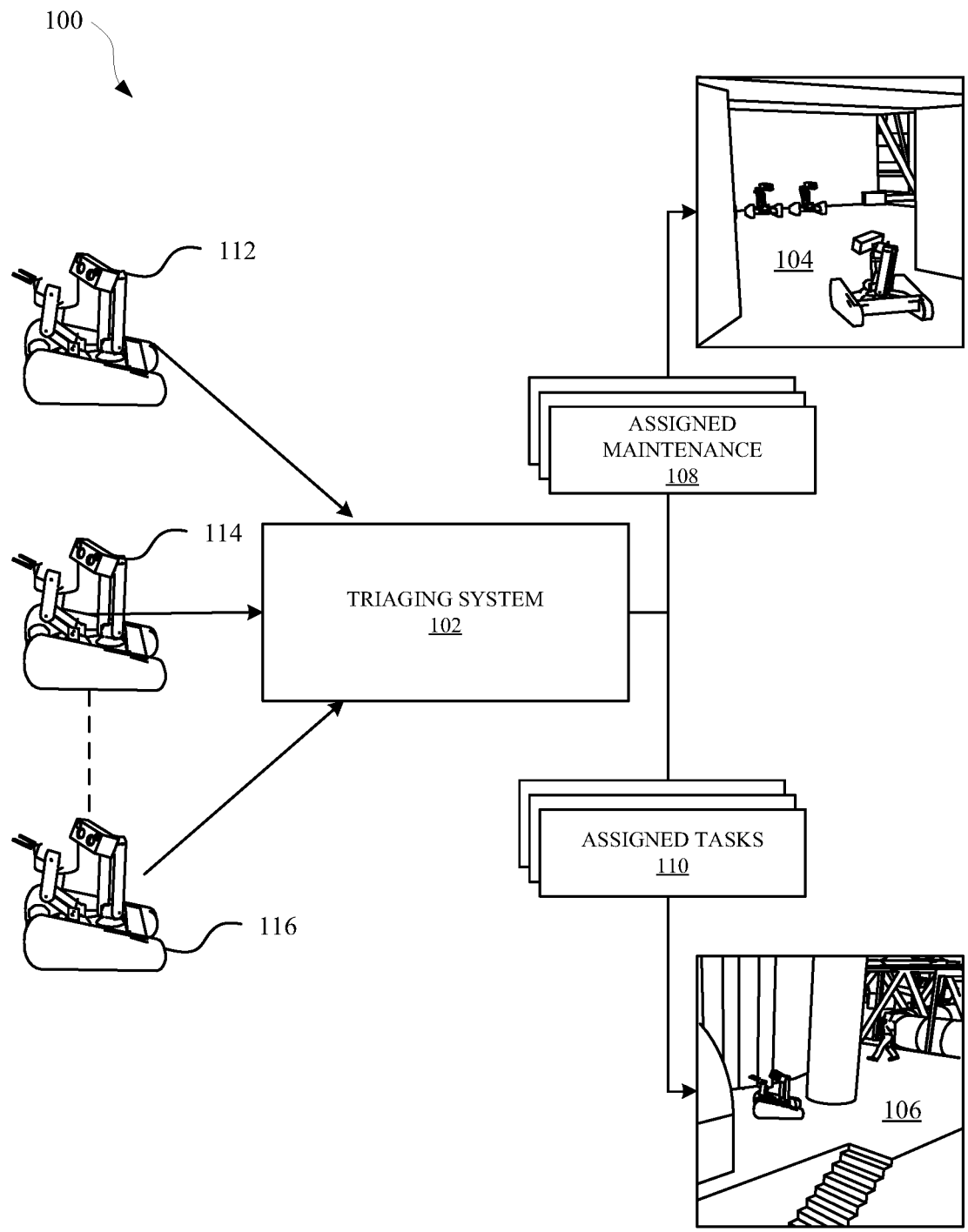
FIG. 1A, FIG. B, and FIG. 1C illustrate views of a triaging system for assisting a fleet of robots in an industrial facility.
Figure 1B:
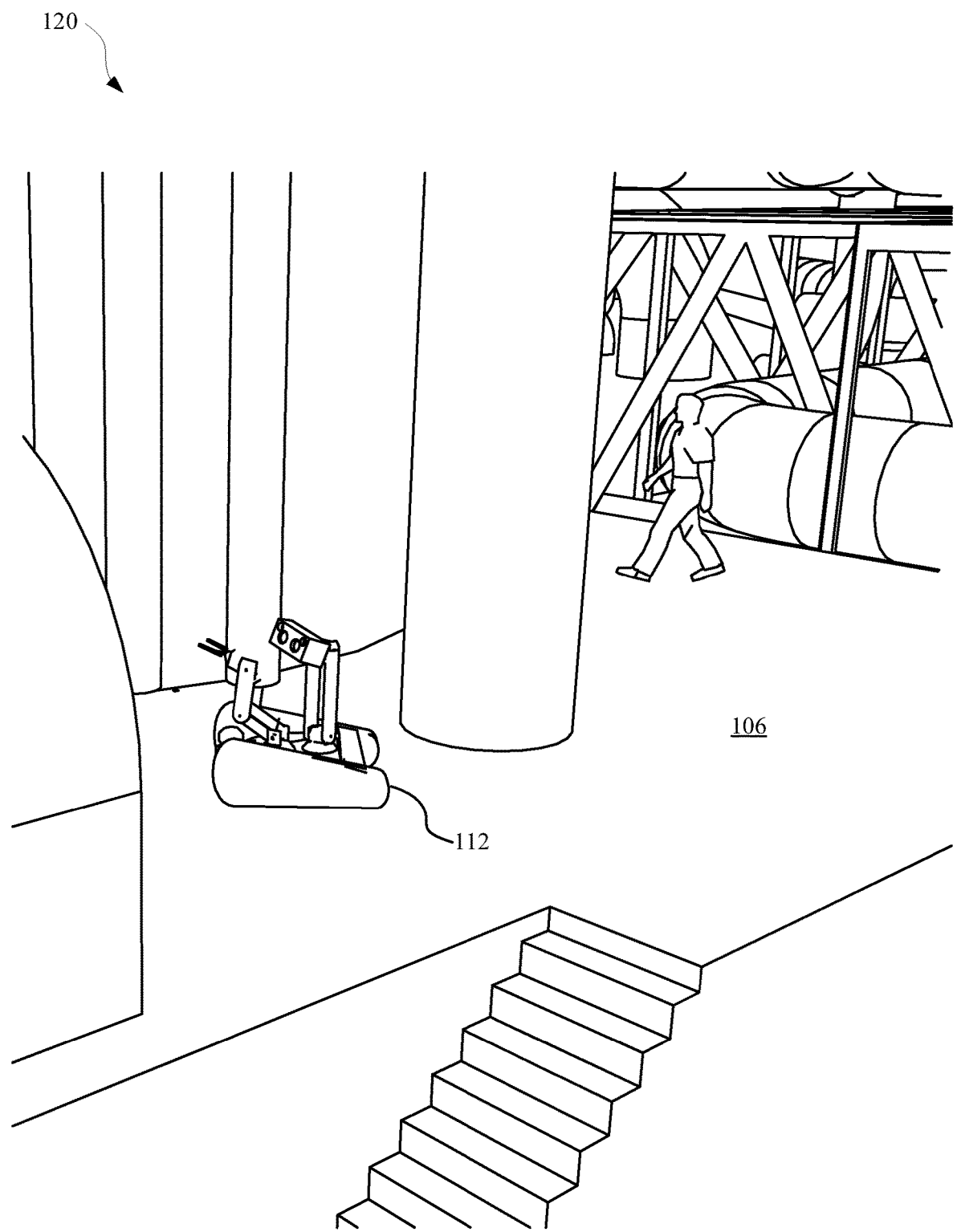
Figure 1C:
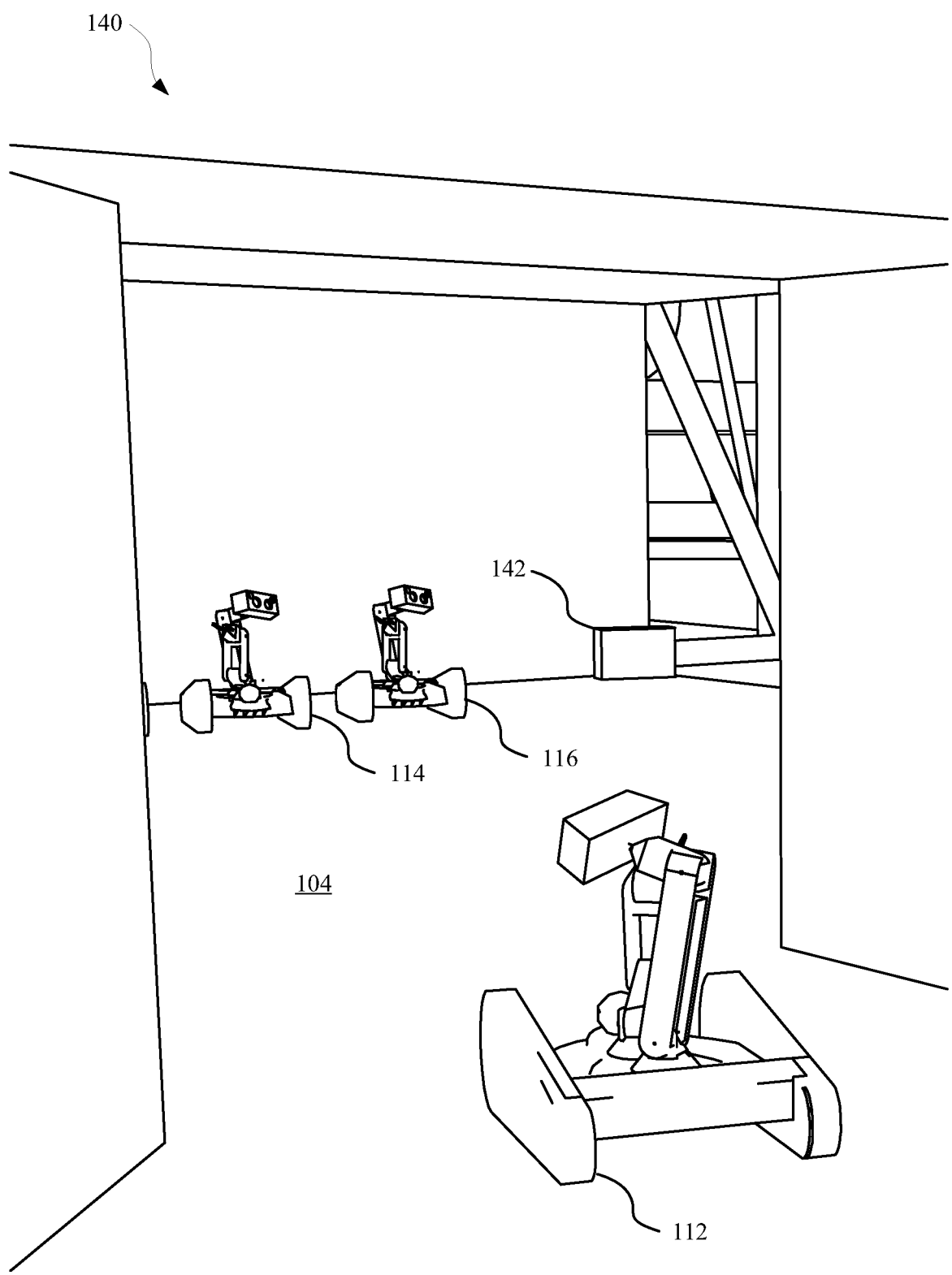

FIG. 1A, FIG. 1B, and FIG. 1C illustrate a view 100, a view 120, and a view 140 of triaging robots at an industrial facility using robot snapshots. As illustrated in FIG. 1A, a triaging system 102 can be utilized to determine whether a plurality of robots (e.g., a first robot 112, a second robot 114, an Nth robot 116, etc.) should receive assigned maintenance 108 and/or assigned tasks 110. In some implementations, the triaging system 102 can assist with controlling a fleet of robots at an industrial facility 106 that can include one or more robot service stations 104. The triaging system 102 can utilize various sources of data such as images of the robots and/or data characterizing features and/or conditions of the robots (including but not limited to versions, statuses, and/or configurations of software applications operating onboard the robots) to generate robot snapshots. In some implementations, the triaging system can be executed by a maintenance robot at the industrial facility (e.g., an Nth robot 116) and/or at another computing device 142 associated with the plurality of robots. In some implementations, the data about the robots can be processed using one or more machine learning models to generate a respective snapshot for each robot of the plurality of robots. Additionally, the triaging system 102 can utilize various sources of task data to generate one or more task embeddings. In some implementations, the task data can characterize subtasks involved in completing a respective task, conditions that may be experienced when performing the task (e.g., extreme heat, weather, etc.), robotic features that may be necessary to complete the task (e.g., relatively long distance travel, heavy lifting, sorting, repairing, welding, communicating, etc.), and/or any information that can be associated with a task.

For example, a snapshot embedding can be generated for a first robot 112, and this snapshot embedding can be mapped to a shared embedding space with a task embedding, which can be based on a task of traversing a hazardous area of an industrial facility to replace a valve. A distance in embedding space (e.g., Euclidean distance, cosine similarity, etc.) between the snapshot embedding and the task embedding can indicate a probability that the first robot 112 is estimated to complete the task. Alternatively, the first robot 112 may already be operating to perform the task but is experiencing a malfunction, and in such circumstances the distance in embedding space can indicate a probability that the first robot 112 is estimated to complete the assigned task. When the latent distance satisfies a threshold value, the first robot 112 can be considered as able to complete the task, and can be deployed in the industrial facility 106 to complete the task, as illustrated in FIG. 1B. However, when the latent distance does not satisfy the threshold value, the first robot 112 can be considered unable to complete the task according to the snapshot of the first robot 112. For example, images of the robot 112 captured before or during performance of the task can indicate that the first robot 112 has a misaligned tread, a malfunctioning arm, a dirty light sensor, and/or any other negative condition that can cause the snapshot embedding to be a greater distance (e.g., measured using techniques such as cosine similarity, Euclidean distance, etc.) from the task embedding in embedding space. As a result of the latent distance not satisfying the threshold value, the triaging system 102 can cause the first robot 112 to maneuver to a robot service station 104, as illustrated in FIG. 1C. As another example, software or firmware executed by the robot 112 may be out-of-date, crash frequently, or otherwise cause suboptimal and/or unpredictable behavior of the robot 112 that also may cause the snapshot embedding to be a greater distance from the task embedding in embedding space.

In addition to or instead of distances in embedding space, in some implementations, one or more regression machine learning models may be trained using historical robot performance data to generate one or more probabilities that a robot will be able to perform a particular task without needing maintenance first. For example, in some implementations, a snapshot of a robot may be used to generate a probability distribution over a plurality of tasks awaiting performance. The probability distribution may include a probability that in its current state, the robot will be able to perform each of the to-be-assigned tasks. Tasks having probabilities that fail to satisfy some minimal threshold may be eliminated from consideration from the outset. Remaining tasks may be ranked by the probabilities, and the robot may be assigned to one or more of the remaining tasks based on those rankings. It may not always be the case that the robot is assigned the highest probability task. For instance, if there is a reasonable probability the robot can perform multiple lower-ranked tasks instead of the highest ranked task, the robot may be deployed accordingly.

Figure 2:
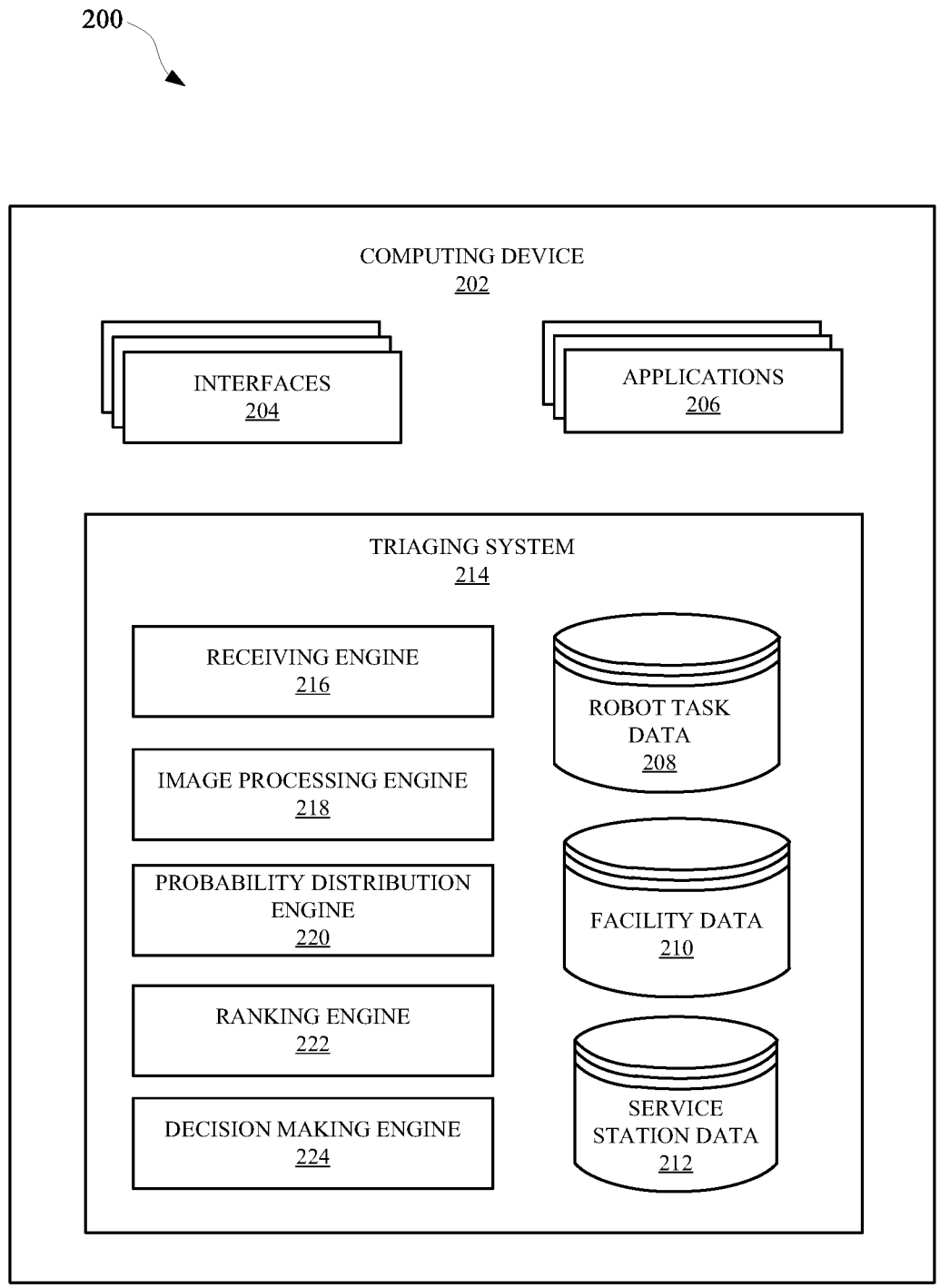
FIG. 2 illustrates a system that can facilitate deployment of a robot triaging system for an industrial facility.

FIG. 2 illustrates a view 200 of a computing device 202 having a triaging system 214, according to some implementations discussed herein. The computing device 202 can represent a computerized robot, or other computing device, for triaging one or more other robots deployed in an industrial facility to perform one or more scheduled robot tasks.

The scheduled robot tasks can include, but are not limited to, drilling holes, arc welding, spot welding, material handling, machine tending, painting, picking, packing, palletizing, assembling, mechanical cutting, grinding, deburring, polishing, and/or any other task that can be performed at an industrial facility by a robot. In some implementations, triaging of the one or more other robots can be performed before deploying a particular robot to perform one or more scheduled robot tasks to check the particular robot can successfully perform the one or more scheduled robot tasks. For example, triaging of the one or more other robots can be performed to select a robot with a highest probability for task completion, in furtherance of maximizing any chance of successfully completing the one or more scheduled robot tasks. In some implementations, the triaging of the one or more robots can be performed to identify any robot that may require maintenance (including software or firmware update), in furtherance of avoiding overcrowding a robot servicing station, which can sometimes be occupied with the robots that do not require maintenance.

As illustrated, the computing device 202 can include one or more interfaces 204, one or more applications 206, robot task data 208, facility data 210, service station data 212, and the triaging system 214. In some implementations, the one or more interfaces 204 can facilitate interactions with users, applications, devices, and/or any other apparatus or module, and the one or more robots in the industrial facility for various purposes. For example, the interfaces 204 can include input interfaces and/or output interfaces for detecting (e.g., detecting energy usage, speed, and/or location), providing feedback (e.g., informing when a task is complete or when an error is made), testing (e.g., running simulations and scenarios to check how the robot would perform in various situations and environments), training (e.g., providing tasks and challenges to complete) of the one or more robots in the industrial facility, and/or otherwise facilitating any other operation that can be performed by a robot.

In some implementations, the one or more applications 206 can optionally be included with the computing device 202 for optionally facilitating a vision system, a 3D scanning and mapping system, one or more machine learning models, one or more machine learning models, an augmented reality system, a remote monitoring and control system, and/or any other system that can be employed by the computing device 202. For example, the vision system can utilize one or more cameras and image processing algorithms to analyze the movement and operation of the one or more other robots in real-time, such as detecting defects, monitoring the quality of any operation, and/or identifying any abnormality in behavior of another robot. In some implementations, the 3D scanning and mapping system can utilize sensors (e.g., a light sensor) to create a 3D map of environment of any robot to allow for accurate positioning and tracking of any robot and/or identifying any obstacle and/or hazard in the industrial facility.

Various machine learning models and/or ensembles thereof can analyze data collected from one or more sensors and cameras to identify patterns and anomalies in the behavior of a robot, and detect potential issues in their initial stages before the issues lead to further malfunctioning. In some implementations, the augmented reality system can overlay information onto a workspace of a robot to provide real-time information about a status of a robot, required maintenance, and/or any potential safety hazards. In some implementations, a remote monitoring and control system can facilitate remote access and control of the robot from a centralized location and/or device (e.g., a central server or other computing device) to improve control, efficiency, and/or safety in the industrial facility. Various types of machine learning models may be trained to perform selected aspects of the present disclosure. These may include, for instance, feed forward neural networks, convolutional neural networks (CNNs), transformer networks with self-attention mechanisms, recurrent neural networks (RNNs), long short-term memory (LSTM) networks, gated recurrent unit (GRU) networks, and so forth. As one example, a CNN and/or transformer can be trained to process image data to generate, for instance, a semantically rich embedding that encodes various visual features of images captured of robots. These embeddings may be processed, e.g., using one or more layers of a neural network, to generate one or more probabilities, e.g., that the depicted robot can perform one or more tasks without requiring maintenance first.

In some implementations, the computing device 202 can include robot task data 208 that can store and/or access a centralized repository of one or more scheduled robot tasks for one or more other robots registered in the industrial facility. Specifically, the robot task data 208 can include data characterizing one or more robot tasks to be performed in one or more industrial facilities, and/or any parameters such as a target location, speed, payload, and/or any other parameter that can assist with characterizing a task. In some implementations, the robot task data 208 can include one or more instructions associated with the one or more scheduled robot tasks, thereby indicating how particular scheduled robot tasks should be performed. For example, the instructions can indicate one or more associated subtasks, sequence of movements of the robots, safety protocols, and/or any quality control checks that should be performed before, during, and/or after performing a particular task. Additionally, the robot task data 208 can include task history data, such as previous instances of the one or more scheduled robot tasks (e.g., date, time, type, duration, etc.) and/or any issues encountered during the performing of the one or more scheduled tasks.

In some implementations, the computing device 202 can include facility data 210, which can characterize details of the one or more robots that are registered with the industrial facility and/or other details about one or more industrial facilities. For example, the stored details of the one or more robots can include, but are not limited to, model number, physical characteristics, any installed sensor, tools, or applications, and/or any other feature of a robot. In some implementations, the computing device 202 can include service station data 212 that can characterize maintenance information for the one or more robots, such as when the one or more robots were serviced, and/or any upcoming maintenance and/or calibration tasks that should be scheduled for any robots in an industrial facility.

In some implementations, the computing device 202 can operate a triaging system 214 that can include, but is not limited to, a receiving engine 216, an image processing engine 218, a probability distribution engine 220, a ranking engine 222, and/or a decision making engine 224. The receiving engine 216 can receive a task to be performed by one or more robots of a plurality of robots that perform maintenance at the industrial facility. In some implementations, the task can be provided by a user via the one or more interfaces 204 of the computing device 202, and/or the task can be provided via a separate device or application that is in communication with the computing device 202.

In some implementations, the receiving engine 216 can also access the facility data 210 to fetch a list of available robots from the plurality of robots registered in the facility.

Based on the fetched list of available robots, the receiving engine 216 can assist the triaging system 214 with generating one or more snapshots for each of the one or more available robots. In some implementations, an image processing engine 218 can provide data for generating the one or more snapshots by causing one or more cameras to capture one or more images of each available robot from different perspectives. Based on these one or more images, a plurality of data points associated with each respective robot can be determined. In some implementations, the plurality of data points can include, but is not limited to, a particular data point indicating whether a particular robot is operating with functioning sensors, malfunctioning sensors, functioning end effectors, malfunctioning end effectors, payloads, joint and actuator wear-and-tear, up-to-date and/or properly-configured software/firmware, and/or any other feature or combination of data points that can be determined from one or more images. In some implementations, the plurality of data points incorporated into a semantically rich embedding, e.g., using a CNN, such that the embedding encodes various visual features that correspond to conditions of the robot. Accordingly, the plurality of data points, derived from the one or more images and one or more other data sources, can collectively indicate a state of the corresponding available robot.

In some implementations, the computing device 202 can include probability distribution engine 220 that can access the one or more scheduled robot tasks that can be performed by one or more robots. In some implementations, data characterizing the robot tasks can include one or more subtasks to be performed when completing the one or more scheduled robot tasks. In some implementations, the probability distribution engine 220 can process the scheduled robot tasks and the determined state of each available robot to determine a probability distribution for each robot of the one or more robots. The probability distribution can provide an indication of a probability of a particular robot completing a particular task of the one or more scheduled robot tasks.

In some implementations, to determine the probability distribution, the probability distribution engine 220 can utilize one or more machine learning models. In some implementations, the one or more machine learning models can be utilized to capture a state of a respective robot, and the state can be represented as, for instance, a snapshot embedding. In some implementations, one or more other machine learning models can be utilized to generate a task embedding from data characterizing the one or more robots tasks and/or subtasks for a respective task. In some implementations, the embeddings can be mapped into a shared embedding space for comparing, and/or predicting, scenarios for certain robots performing certain tasks. A distance in embedding space between a particular robot snapshot embedding and a task embedding can indicate or otherwise be utilized to determine a probability for the probability distribution engine 220. In some implementations, a subset of robots of a plurality of robots at an industrial facility can be selected based on their respective embeddings satisfying a threshold probability for successfully completing a task corresponding to a task embedding. When more than one robot is included in the subset of robots, additional processing can be performed to select a particular robot, from the subset of robots, for delegating the task corresponding to the task embedding.

In some implementations, in order to simulate all possible scenarios, the one or more machine learning models can be pre-trained using historical data associated with one or more tasks performed in the past. In some implementations, the historical data can include historical robot snapshots of one or more robots prior to performing the one or more historical robot tasks, and can also provide details of outcomes of the one or more historical tasks. In some implementations, an outcome can indicate success or failure of a particular robot completing a particular past task. In some implementations, an outcome can indicate data such as environmental changes made and/or affected, calibrations required during and/or after the past task, duration to arrive at outcome, speed to arrive at outcome, and/or any other information that can be associated with an outcome of a task.

In some implementations, the computing device 202 can include a decision making engine 224 that can determine an estimated probability value of a selected robot to successfully perform a received task. In some implementations, the estimated probability value can be determined from the determined probability distribution, and/or by taking an average, mean, median, and/or standard deviation of a probability distribution for subtasks of a received task. In some implementations, the decision making engine 224 can compare the determine estimated probability value with a threshold value. For example, the threshold value be selected based on user preference, criticality of the received task, historical success or failure records of completing the received tasks, historical success or failure records of the corresponding robot, and/or any other suitable basis for selecting a threshold value.

In some instances, when the estimated probability value satisfies the threshold value, the decision making engine 224 can estimate that the corresponding robot can complete the received task successfully. Based on such a conclusion, the decision making engine 224 can direct the robot to perform the received task in the industrial facility. In other instances, when the estimated probability value does not satisfy the threshold value, the decision making engine 224 can estimate that the corresponding robot cannot complete the received task successfully. Based on such a conclusion, the decision making engine 224 can direct the corresponding robot to move to a robot servicing station for maintenance and/or otherwise communicate with the robot servicing station to assign maintenance to the corresponding robot.

In some implementations, the decision making engine 224 can detect that more than one robot from the one or more filtered robots can complete the received task successfully. In such a scenario, the decision making engine 224 can communicate with the ranking engine 222 to decide which robot should perform the received task. The ranking engine 222 can determine a respective rank for each of the one or more robots that are detected to complete the received task successfully. The respective rank can be determined based on the calculated probability value, such that the robot with the highest probability value can be selected to perform a task, assuming that probability value satisfies a threshold value. Based on the determined rank, the ranking engine 222 can communicate to the decision making engine 224 details of the robot with the highest rank indicating the highest success rate for completing the received task. Accordingly, the decision making engine 225 can direct the corresponding robot to perform the received task in the industrial facility.

Figure 3:
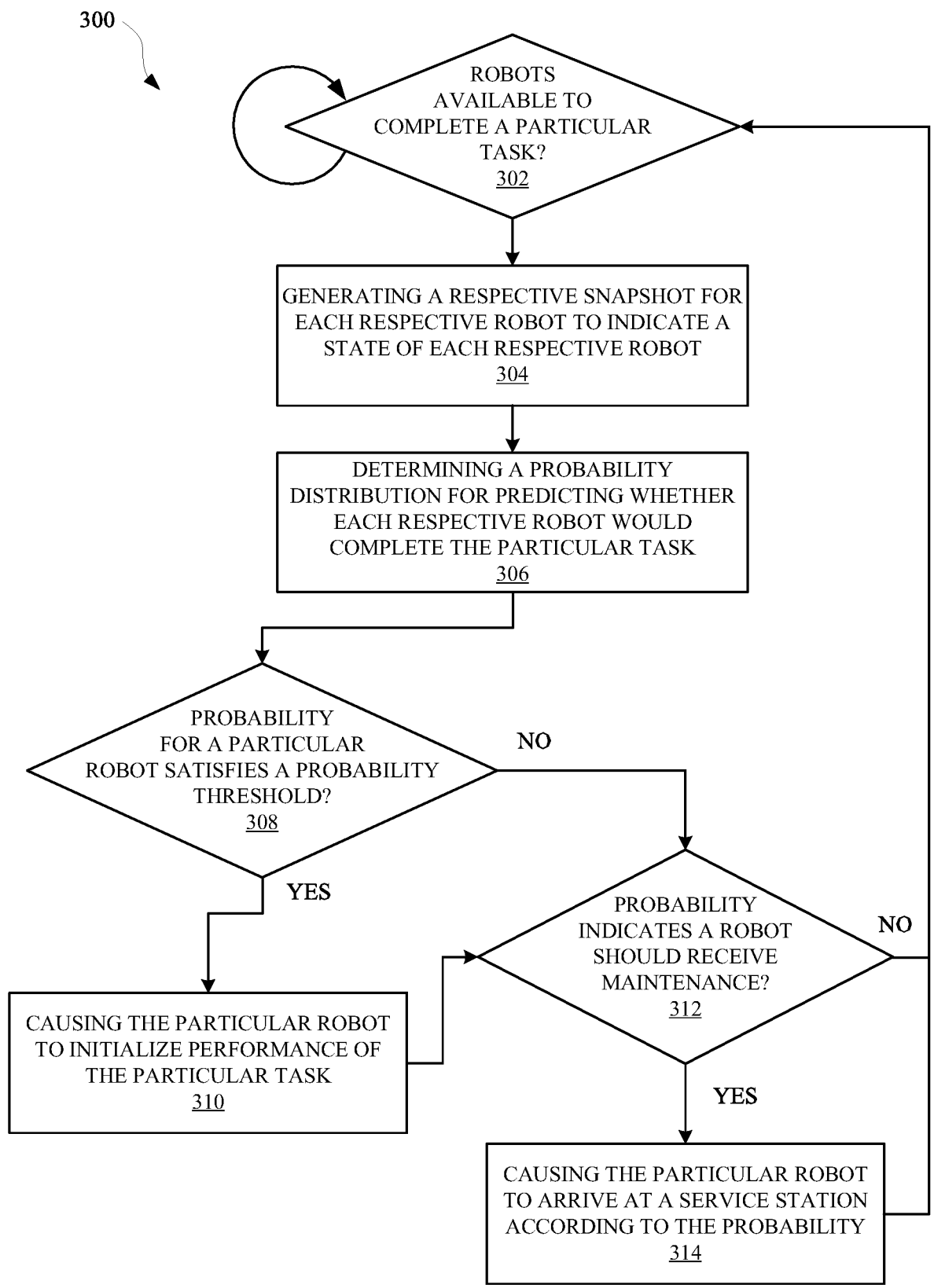
FIG. 3 illustrates a method for triaging one or more robots of an industrial facility using generated snapshots, and determining whether a robot should be assigned a task or receive maintenance.

FIG. 3 illustrates a method 300 for triaging one or more robots of an industrial facility using generated snapshots, and determining whether a robot should be assigned a task or receive maintenance. The method 300 can be performed by one or more computing devices, applications, robots, and/or any other apparatus or module that can be associated with a robot. The method 300 can include an operation 302 of determining whether any robots are available for performing a particular task, set of tasks, and/or subtasks. For example, the operation 302 can be performed by a maintenance robot that is responsible for coordinating a fleet of robots at an industrial facility. The maintenance robot can receive task data indicating that a task is available for a robot to perform, and based on this task data, the maintenance robot can determine whether any robots are suitable to be assigned the task. When the maintenance robot determines that certain robots are available for completing the task, the method 300 can proceed from the operation 302 to an operation 304. Otherwise, the maintenance robot can continue to check a log of robots at the industrial facility to determine whether any particular robots are suitable for being assigned the task.

The operation 304 can include generating a respective snapshot for each respective robot to indicate a state of each respective robot. In some implementations, a snapshot can be generated based on robot data from various sources and provided to one or more machine learning models for generating an embedding that can represent a particular snapshot. One source of the robot data can one or more images of a particular robot captured from one or more different perspectives while the particular robot is at the industrial facility and/or any other location. In some implementations, one or more machine learning models (e.g., CNN or transformer) can be utilized to process each particular image to identify visual features of a particular robot. For example, processing a perspective view of a robot can result in certain robot data such as labels or tags that can describe, grade, or otherwise qualify certain functionality of the robot (e.g., robot camera is obstructed, robot camera is clear of obstructions, wheels have no signs of ware, robot is exhibiting lack of battery power, etc.).

Alternatively, or additionally, the snapshot can be generated based on robot data provided by or on behalf of each particular robot, one or more devices that are in communication with any robot, one or more applications associated with a robot, and/or any other source of data. For example, each robot can include a diagnostics application that can provide data regarding certain systems of a respective robot. The diagnostics application can communicate over a local network with the maintenance robot to provide robot data to the maintenance robot. This robot data can indicate certain measurements or other data captured by the diagnostics application such as, but not limited to, battery charge, results of recent sensor calibrations, degradation of operability of certain robot components (e.g., motors, sensors, semiconductors, cooling systems, hazard shields, etc.), versions, configurations, and/or statuses of software/firmware operating on the robot, and so forth. This robot data, and/or any data derived from the images can serve as a basis for generating a snapshot for a respective robot. In some implementations, a machine learning model configured for processing a sequence of data, such as a transformer or various types of RNNs, may be applied to time series data about a robot. For example, a sequence of images captured of a robot, e.g., as part of a video, may be processed using an RNN, LSTM, or transformer (in which case the images may be linearized into a sequence of input tokens/embeddings) to iteratively generate a sequence of states of the robot and/or a sequence of probabilities that the robot can perform some task without receiving maintenance first.

The method 300 can proceed from the operation 304 to an operation 306, which can include determining a probability distribution for predicting whether each respective robot would complete the particular task. For example, multiple robots can be available at the industrial facility for assigning the particular task, which can be a task of removing parts from a hazardous area of the industrial facility. Features of this task that can inhibit performance of a robot can include the weight of the parts and the types of hazards that the robot will experience during the task.

In some implementations, determining the probability distribution can include generating a task embedding based on task data that characterizes the task. The task data can also be processed using one or more other neural networks and/or one or more heuristic processes to generate a task embedding for the particular task. When the task embedding is generated, the task embedding can be mapped to an embedding space with the snapshot embeddings. In some implementations, a distance between the snapshot embeddings and the task embedding can indicate whether features of the task will inhibit performance of certain robots. For example, when a snapshot embedding is generated for a robot that has a vision sensor that is obstructed by grease or oil, the snapshot embedding can exhibit a relatively further distance in embedding space from the task embedding—at least relative to another snapshot embedding that was generated based on another robot whose vision sensor is not currently obstructed. In some implementations, each distance in embedding space between the task embedding and each snapshot embedding can be determined and utilized as a basis for determining the probability distribution for predicting whether each robot would successfully complete the task. In other words, each distance can be proportional to, or otherwise be utilized to determine, a probability value that is optionally mapped to a probability distribution or other collection of probability values. Alternatively, the snapshot embedding may result in a regression machine learning model predicting a lower likelihood that the robot can perform that task than another robot without an obstructed vision sensor.

However the probability is generated, the method 300 can then proceed from the operation 306 to an operation 308 of determining whether the probability for a particular robot satisfies a probability threshold. In some implementations, the probability threshold can be determined for each probability distribution or, alternatively, can be a static value assigned to one or more tasks. For example, the probability threshold can be satisfied when there is a robot that is associated with a highest probability, or most prioritized probability, relative to the other probabilities. Alternatively, or additionally, the probability threshold can be satisfied when a probability for a robot satisfies a threshold value for a particular task. When a probability for a particular robot is determined to satisfy the probability threshold, the method 300 can proceed from the operation 308 to an operation 310. The operation 310 can include causing the particular robot to initialize performance of the particular task (e.g., performing maintenance in the hazardous area). The method 300 can optionally proceed from the operation 310 to an operation 312. Alternatively, when a probability for a particular robot does not satisfy the probability threshold, the method 300 can proceed from the operation 308 to an operation 312, which can include determining whether one or more respective probabilities for one or more robots indicate any particular robot should receive maintenance.

In some implementations, when a probability for estimating whether a particular robot will successfully complete a particular task falls below a probability threshold for that task, and/or falls below the probability threshold by a threshold degree, the particular robot can be considered to be due for maintenance before being assigned a task. For example, when a robot has a determined probability that falls below the probability threshold for the task of removing parts from the hazardous area, that robot can be considered to be due for maintenance. In some implementations, maintenance assigned to the robot can be correlated to the task and/or subtasks, such as inspecting any shielding that the robot may rely upon in the hazardous area, motors and/or gears that may be used for lifting the parts out of the hazardous area, and/or navigation systems for navigating to and from the hazardous area.

When a probability for a particular robot indicates that the robot should receive maintenance, the method 300 can proceed from the operation 312 to an operation 314. Otherwise, the method 300 can proceed from the operation 312 to the operation 302, or another suitable operation for facilitating triaging of robots associated with the industrial facility. The operation 314 can include causing the particular robot to arrive at a service station of the industrial facility or at another location. In some implementations, the maintenance robot can be located at the service station, and/or otherwise represent the service station, and can initialize performance of maintenance on the particular robot. Alternatively, or additionally, the maintenance robot can initialize maintenance for the particular robot when the particular robot has a maintenance rank that is prioritized over any other robot at the service station. Alternatively, or additionally, the particular robot can be caused to arrive at the service station when the maintenance robot determines that there is space available at the service station for the particular robot.

In some implementations, the triaging system for the robots in the industrial facility can identify and address any safety concerns before resulting in accidents or injuries, thus reducing the risk that the robots can pose to human workers if they malfunction or behave unexpectedly. In some implementations, the triaging system for the robots in the industrial facility can prioritize tasks and allocate robot resources accordingly to ensure that the most important tasks are completed first, thus improving the efficiency of the industrial facility. In some implementations, the triaging system for the robots in the industrial facility can help identify issues and schedule maintenance and/or repairs as needed to reduce downtime while ensuring that the robots remain in working condition. In some implementations, the triaging system for the robots in the industrial facility can help reduce the costs associated with maintenance and repairs of the robots by identifying issues early and preventing more serious problems from developing. Accordingly, the triaging system ensures the safe and efficient operation of the robots in the industrial facility.

Figure 4:
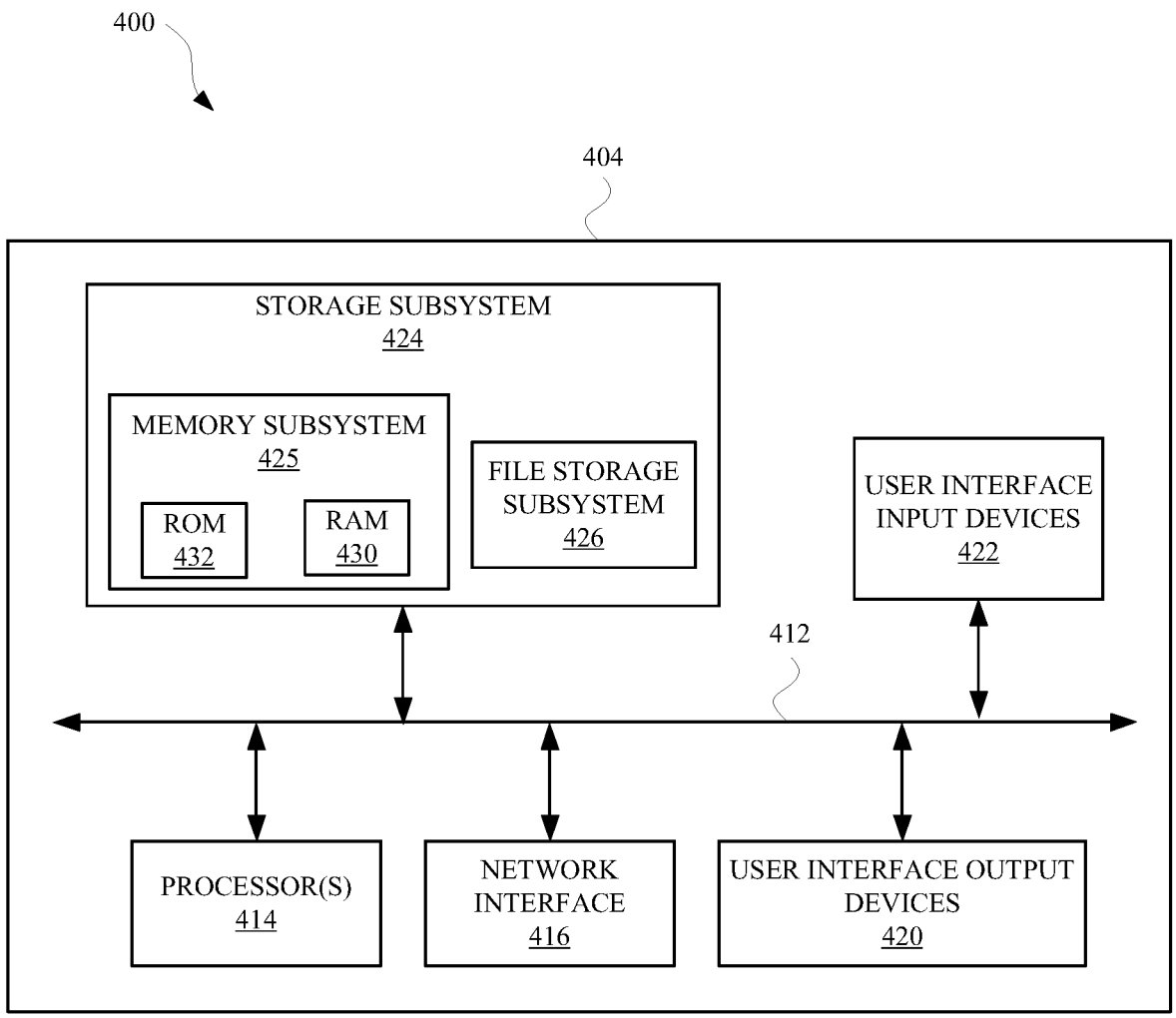
FIG. 4 illustrates an example computer system that can implement any of the implementations discussed herein.

FIG. 4 is a block diagram 400 of an example computer system 404. Computer system 404 typically includes at least one processor 414 which communicates with a number of peripheral devices via bus subsystem 412. These peripheral devices can include a storage subsystem 424, including, for example, a memory 425 and a file storage subsystem 426, user interface output devices 420, user interface input devices 422, and a network interface subsystem 416. The input and output devices allow user interaction with computer system 404. Network interface subsystem 416 provides an interface to outside networks and is coupled to corresponding interface devices in other computer systems.

User interface input devices 422 can include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 404 or onto a communication network.

User interface output devices 420 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computer system 404 to the user or to another machine or computer system.

Storage subsystem 424 stores programming and data constructs that provide the functionality of some or all of the modules described herein. For example, the storage subsystem 424 can include the logic to perform selected aspects of the method 300, and/or to implement one or more of the computing device 202, computing device 142, any robot, the triaging system 214, and/or any other application, device, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 426 in the storage subsystem 424, or in other machines accessible by the processor(s) 414.

Bus subsystem 412 provides a mechanism for letting the various components and subsystems of computer system 404 communicate with each other as intended. Although bus subsystem 412 is shown schematically as a single bus, alternative implementations of the bus subsystem can use multiple busses.

Computer system 404 can be of varying types including a workstation, server, computing cluster, blade server, server farm, or any other data processing system or computing device. Due to the ever-changing nature of computers and networks, the description of computer system 404 depicted in FIG. 4 is intended only as a specific example for purposes of illustrating some implementations. Many other configurations of computer system 404 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining a task to be performed by a robot in an industrial facility having a plurality of robots that perform maintenance at the industrial facility;
   generating snapshots corresponding to the plurality of robots,
      wherein each snapshot of the snapshots includes a plurality of data points that collectively indicate a state of a respective robot of the plurality of robots;
   determining, based on the snapshots and the task to be performed by the robot, a probability distribution of each respective robot of the plurality of robots completing the task,
      wherein the probability distribution is determined using one or more machine learning models;
   determining, based on the probability distribution, a respective rank for each robot of the plurality of robots in furtherance of identifying a particular available robot with a most prioritized rank for completing the task; and
   causing, based on the respective rank for each robot of the plurality of robots, the particular robot with the most prioritized rank to perform the task.

2. The method of claim 1, wherein the snapshots are generated based on at least one or more images of the plurality of robots captured, at the industrial facility, from one or more different perspectives, and applied as input across a given machine learning model of the one or more machine learning models.

3. The method of claim 1, wherein the plurality of data points includes a particular data point that indicates whether a sensor of the respective robot is malfunctioning.

4. The method of claim 1, wherein the plurality of data points includes a particular data point that indicates mechanical wear of a portion of the respective robot.

5. The method of claim 1, wherein determining the probability distribution includes:
   encoding, using one or more neural networks, each respective snapshot of the snapshots into a respective snapshot embedding;
   wherein each probability of the probability distribution is based on a respective snapshot embedding and task data that characterizes the task.

6. The method of claim 1,
   wherein the one or more machine learning models are trained using historical data for each of the plurality of robots, and
   wherein the historical data for each robot of the plurality of robots characterizes: a corresponding historical robot snapshot, and an outcome of the corresponding robot performing a historical robot task subsequent to capturing the corresponding historical snapshot.

7. The method of claim 1, wherein determining the probability distribution includes:
   determining an estimated probability value of each robot of the plurality of the robots successfully performing the task; and
   determining whether the estimated probability value satisfies a threshold value,
      wherein one or more robots of the plurality of robots are directed to arrive at a robot servicing station for maintenance in response to determining corresponding estimated probability values do not satisfy the threshold value.

8. A system, comprising:
   one or more processors; and
   memory storing instructions that, when executed by the one or more processors, cause the one or more processors to perform operations that include:
      determining that a robot, of a plurality of robots at an industrial facility, is exhibiting a malfunction while performing an unfinished task;
      determining, in response to the robot exhibiting the malfunction, one or more subtasks for completing the unfinished task;
      obtaining one or more snapshots for one or more robots, of the plurality of robots, that are in queue for maintenance at a robot service station,
         wherein each snapshot of the one or more snapshots includes a plurality of data points that collectively indicate a state of a respective robot of the one or more robots;
      determining, based on the one or more snapshots and the one or more subtasks, a probability distribution that indicates a probability of each respective robot of the one or more robots completing the unfinished task,
         wherein the probability distribution is determined using one or more machine learning models; and
      determining, based on the probability distribution, ranks for the one or more robots in furtherance of identifying a particular robot, of the one or more robots, with a most prioritized rank for completing the unfinished task; and
      causing, based on the ranks for the one or more robots, the particular robot with the most prioritized rank to perform the one or more subtasks in furtherance of completing the unfinished task.

9. The system of claim 8, wherein the one or more snapshots are generated based on at least one or more images of the one or more robots.

10. The system of claim 9, wherein the plurality of data points includes a particular data point that indicates whether a sensor of the respective robot is malfunctioning, and another particular data point that indicates a degree of mechanical wear of a portion of the respective robot.

11. The system of claim 8, wherein determining the probability distribution includes:
   encoding, using one or more neural networks, each respective snapshot of the one or more snapshots into a respective snapshot embedding;
   wherein determining the probability distribution is based on each respective snapshot embedding and task data that characterizes the one or more subtasks.

12. The system of claim 11,
   wherein the one or more machine learning models are trained using historical data for each robot of the one or more robots, and wherein the historical data characterizes: a corresponding historical robot snapshot, and an outcome of the corresponding robot performing a historical robot task subsequent to capturing the corresponding historical snapshot.

13. A system comprising one or more processors and memory storing instructions that, in response to execution by one or more of the processors, cause the one or more processors to:
- determine a task to be performed by a robot in an industrial facility having a plurality of robots that perform maintenance at the industrial facility;
- generate snapshots corresponding to the plurality of robots,
  - wherein each snapshot of the snapshots includes a plurality of data points that collectively indicate a state of a respective robot of the plurality of robots;
- determine, based on the snapshots and the task to be performed by the robot, a probability distribution of each respective robot of the plurality of robots completing the task,
  - wherein the probability distribution is determined using one or more machine learning models;
- determine, based on the probability distribution, a respective rank for each robot of the plurality of robots in furtherance of identifying a particular available robot with a most prioritized rank for completing the task; and
- cause, based on the respective rank for each robot of the plurality of robots, the particular robot with the most prioritized rank to perform the task.

14. The system of claim 13, wherein the snapshots are generated based on at least one or more images of the plurality of robots captured, at the industrial facility, from one or more different perspectives, and applied as input across a given machine learning model of the one or more machine learning models.

15. The system of claim 13, wherein the plurality of data points includes a particular data point that indicates whether a sensor of the respective robot is malfunctioning.

16. The system of claim 13, wherein the plurality of data points includes a particular data point that indicates mechanical wear of a portion of the respective robot.

17. The system of claim 13, wherein the instructions to determine the probability distribution include instructions to:
- encode, using one or more neural networks, each respective snapshot of the snapshots into a respective snapshot embedding;
  - wherein each probability of the probability distribution is based on a respective snapshot embedding and task data that characterizes the task.

18. The system of claim 13,
- wherein the one or more machine learning models are trained using historical data for each of the plurality of robots, and
- wherein the historical data for each robot of the plurality of robots characterizes: a corresponding historical robot snapshot, and an outcome of the corresponding robot performing a historical robot task subsequent to capturing the corresponding historical snapshot.

19. The system of claim 13, wherein the instructions to determine the probability distribution include instructions to:
- determine an estimated probability value of each robot of the plurality of the robots successfully performing the task; and
- determine whether the estimated probability value satisfies a threshold value,
  - wherein one or more robots of the plurality of robots are directed to arrive at a robot servicing station for maintenance in response to determining corresponding estimated probability values do not satisfy the threshold value.

* * * * *